United States Patent
Xie

(10) Patent No.: US 9,571,998 B2
(45) Date of Patent: Feb. 14, 2017

(54) SYSTEM AND METHOD FOR ASYNCHRONOUS EVENT REPORTING

(71) Applicant: Marvell World Trade Ltd., St. Michael (BB)

(72) Inventor: Liming Xie, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 504 days.

(21) Appl. No.: 14/148,853

(22) Filed: Jan. 7, 2014

(65) Prior Publication Data

US 2014/0201358 A1 Jul. 17, 2014

Related U.S. Application Data

(60) Provisional application No. 61/752,777, filed on Jan. 15, 2013.

(51) Int. Cl.
*H04L 12/24* (2006.01)
*H04W 4/20* (2009.01)
*H04W 4/00* (2009.01)
*H04W 4/02* (2009.01)

(52) U.S. Cl.
CPC ............. *H04W 4/20* (2013.01); *H04W 4/006* (2013.01); *H04W 4/028* (2013.01)

(58) Field of Classification Search
CPC ........ H04W 4/006; H04W 4/20; H04W 4/028; H04W 68/02; H04W 4/206
USPC ........................................................ 709/224
See application file for complete search history.

(56) References Cited

U.S. PATENT DOCUMENTS

| 6,931,405 B2 | 8/2005 | El-Shimi et al. |
| 7,457,914 B2 | 11/2008 | Cordella et al. |
| 8,564,345 B2 | 10/2013 | Yu |
| 2009/0125517 A1* | 5/2009 | Krishnaswamy ...... G06Q 30/02 |
| 2012/0059951 A1* | 3/2012 | Gutarin ............... H04L 47/2416 709/233 |

* cited by examiner

*Primary Examiner* — Tu Nguyen

(57) ABSTRACT

Systems and methods for event reporting are provided. In a method for event reporting in a system that includes an event source and a plurality of event consumers, notifications from the event source are received at an event reporter. The notifications are received at a first rate. The event reporter receives a plurality of desired sampling rates from the plurality of event consumers, where each of the desired the sampling rates indicates a rate at which an event consumer desires reporting of notifications from the event reporter. The notifications are filtered based on the first rate and the plurality of desired sampling rates. The filtering selects one or more of the notifications to be reported to one or more event consumers of the plurality of event consumers. The selected one or more of the notifications are reported.

20 Claims, 6 Drawing Sheets

US 9,571,998 B2

SYSTEM AND METHOD FOR ASYNCHRONOUS EVENT REPORTING

CROSS-REFERENCE TO RELATED APPLICATIONS

This disclosure claims priority to U.S. Provisional Patent Application No. 61/752,777, filed on Jan. 15, 2013, which is incorporated herein by reference in its entirety.

TECHNICAL FIELD

The technology described in this document relates generally to event notification technology and more particularly to a method for event reporting in a system that includes an event source and one or more event consumers.

BACKGROUND

Mobile devices such as smart phones are rapidly evolving and maturing as a platform to serve the computational and communication needs of users. A growing number of mobile phones have embedded sensors which can sense aspects of a user's environment. For example, many smart phones include built-in accelerometers, global positioning system (GPS) functionality, light sensors, microphones, proximity sensors, cameras, compasses, and gyroscopes. Additionally, there are sensors available that can communicate using low power RF communication technology and push data to mobile devices. These sensors, along with the local computational power and the communication capability built into the mobile devices, enable applications in fields such as location-based tracking, healthcare, remote monitoring, and environmental monitoring.

SUMMARY

The present disclosure is directed to systems and methods for event reporting. In a method for event reporting in a system that includes an event source and a plurality of event consumers, notifications from the event source are received at an event reporter. The notifications are received at a first rate. The event reporter receives a plurality of desired sampling rates from the plurality of event consumers, where each of the desired sampling rates indicates a rate at which an event consumer desires reporting of notifications from the event reporter. The notifications are filtered based on the first rate and the plurality of desired sampling rates. The filtering selects one or more of the notifications to be reported to one or more event consumers of the plurality of the event consumers. The selected one or more of the notifications are reported.

In another example, a system for event reporting includes an event source configured to generate notifications. The system further includes an event reporter that is configured to receive notifications from the event source. The notifications are received at the event reporter at a first rate. The event reporter is also configured to receive a plurality of desired sampling rates from a plurality of event consumers, where each of the desired sampling rates indicates a rate at which an event consumer desires reporting of notifications from the event reporter. The event reporter filters the notifications based on the first rate and the plurality of desired sampling rates, where the filtering selects one or more of the notifications to be reported to one or more event consumers of the plurality of the event consumers. The event reporter is further configured to report the selected one or more of the notifications.

DETAILED DESCRIPTION

Figure 1:
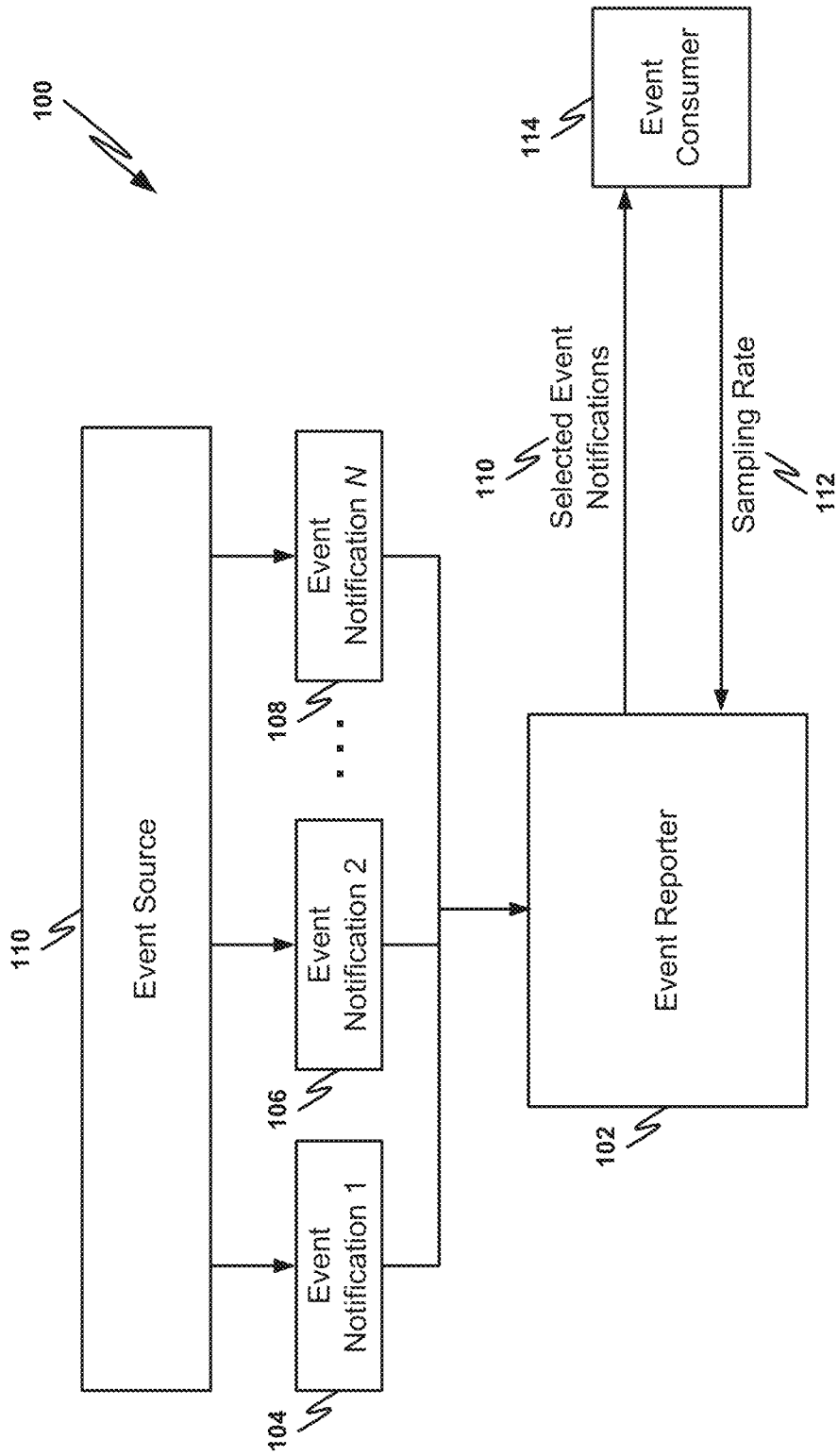
FIG. 1 depicts an example system for event reporting.

FIG. 1 depicts an example system 100 for event reporting. In the example system 100, an event reporter 102 receives a plurality of event notifications 104, 106, 108 from an event source 110. The event notifications 104, 106, 108 correspond to events that occur in the event source 110, with the "event notification 1" 104 corresponding to a first event, the "event notification 2" 106 corresponding to a second event, and the "event notification N" corresponding to an Nth event. The event notifications 104, 106, 108 are received at the event reporter 102 on a serial basis, with "event notification 2" being received after "event notification 1," and so on.

The notifications 104, 106, 108 are received at the event reporter 102 at a first rate (i.e., a first frequency), where the first rate is determined based on the event source 110. For example, in the example system 100, the event source 110 may be a sensor device that generates data at the first rate. The event source 110 may be, for example, an accelerometer sensor, a temperature sensor, a gravity sensor, a gyroscope sensor, a light sensor, a magnetic field sensor, a pressure sensor, or a humidity sensor, among other types. In the event source 110, an event may correspond to a measurement of a condition (e.g., a temperature) and a corresponding generation of data for the measurement (e.g., a numerical indication of the temperature in degrees). The first rate at which the event source 110 generates the data determines an amount of time between the receipt of each of the notifications 104, 106, 108 at the event reporter 102. In an example, the first rate dictates that the event notifications 104, 106, 108 are received at the event reporter 102 at 10 millisecond (ms) time intervals.

The event reporter 102 also receives a desired sampling rate 112 from an event consumer 114. The desired sampling rate 112 indicates a rate at which the event consumer 114 desires reporting of event notifications from the event reporter 102. For example, although the event source 110 generates and sends data to the event reporter 102 at the aforementioned first rate, the event consumer 114 may not desire reporting of data at the same first rate. Rather, the desired sampling rate 112 may be greater than or less than the first rate at which the event notifications 104, 106, 108 are received at the event reporter 102. In an example, the event source 110 includes a course-grained timer that causes the event source 110 to generate and send the event notifications 104, 106, 108 to the event reporter 102 every 10 ms. In this example, the event consumer 114 may desire reporting of events at the desired sampling rate 112 of 5 ms, 20 ms, or 33 ms, for example.

In attempting to best meet the desired sampling rate 112 of the event consumer 114, the event reporter 102 filters the event notifications 104, 106, 108 based on the first rate and the desired sampling rate 112. The filtering selects one or more of the event notifications 104, 106, 108 to be reported to the event consumer 114, and the event notifications 104, 106, 108 not selected by the filtering are not reported to the event consumer 114. The event reporter 102 reports the selected one or more of the event notifications 110 to the event consumer 114.

In an example, the event source 110 includes the aforementioned course-grained timer that causes the event source 110 to send the event notifications 104, 106, 108 to the event reporter 102 every 10 ms. If the desired sampling rate 112 indicates that the event consumer 114 desires event reporting every 33 ms, the event reporter 102 reports event notifications to the event consumer 114 every 30 ms. By reporting the event notifications every 30 ms, certain of the event notifications 104, 106, 108 are effectively filtered out by the event reporter 102 and not reported to the event consumer 114. If the desired sampling rate 112 indicates that the event consumer 114 desires event reporting every 5 ms, the event reporter 102 reports event notifications to the event consumer 114 every 10 ms in this example. In these examples, where a frequency of the reporting is not equal to the desired sampling rate 112, such inaccuracy is tolerated by the event consumer 114.

Although the example of FIG. 1 depicts the event reporter 102, event source 110, and event consumer 114 as being separate entities, in other examples, these components 102, 110, 114 may be combined in various ways. For example, the event reporter 102 and the event source 110 may comprise one integrated component. The system 100 may comprise hardware or software components included within one or more devices. Thus, in one example, the system 100 is encompassed in hardware or software modules of a mobile device (e.g., smart phone, tablet, laptop computer, etc) or another computer system, and the event consumer 114 is an application or other client seeking to receive data from the on-board event source 110 (e.g., a sensor device included on the mobile device or computer system). In another example, the system 100 includes distributed components, such that the event source 110 transmits the event notifications 104, 106, 108 to the event reporter 102 via a wireless or wired connection.

Figure 2:
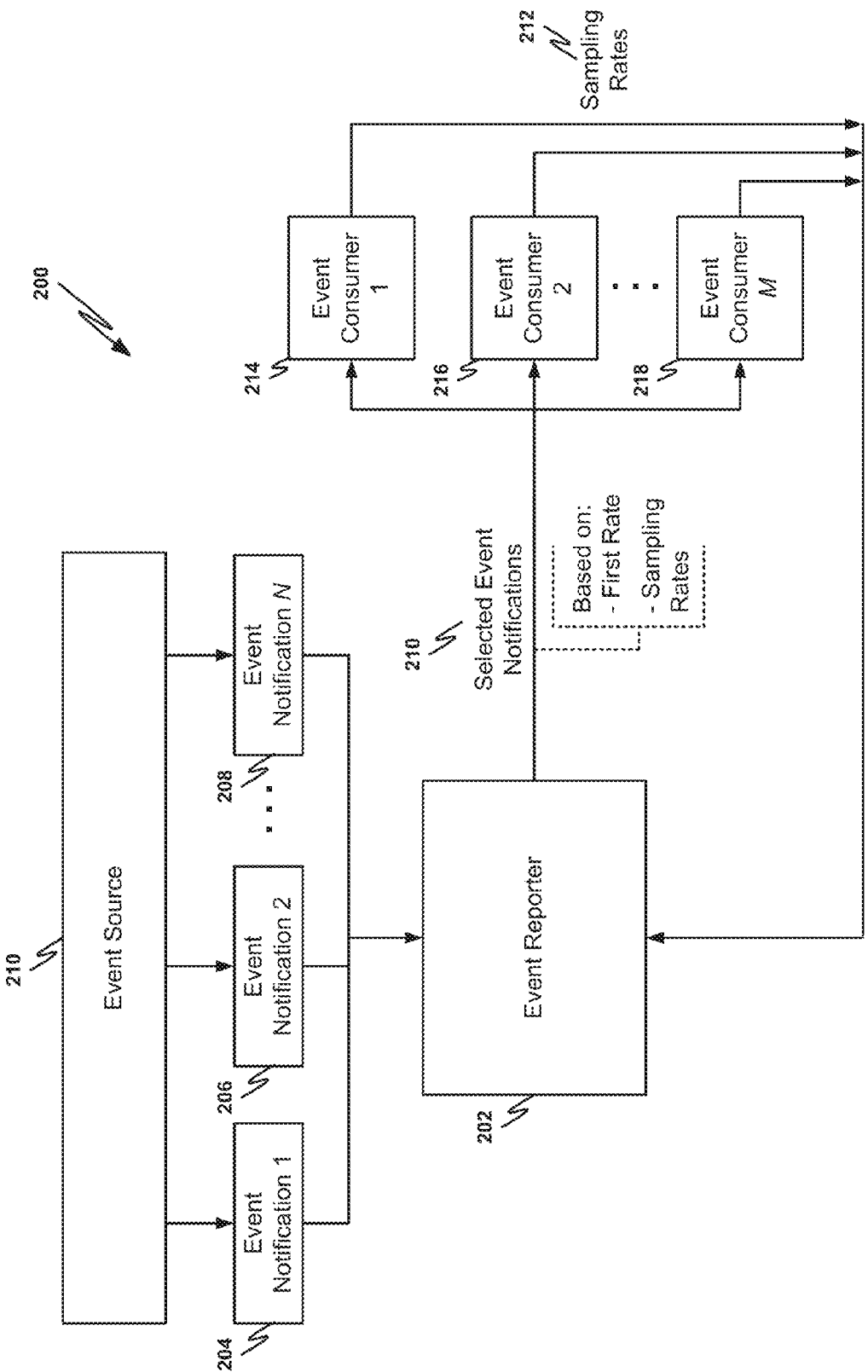
FIG. 2 depicts an example system for event reporting, where the example system includes an event source and a plurality of event consumers.

FIG. 2 depicts an example system 200 for event reporting, where the example system 200 includes an event source 210 and a plurality of event consumers 214, 216, 218. Aspects of the example system 200 are similar to those depicted in FIG. 1. For example, in the system 200, an event reporter 202 receives a plurality of event notifications 204, 206, 208 from the event source 210. The event notifications 204, 206, 208 correspond to events that occur in the event source 210 (e.g., the "event notification 1" 204 corresponds to a first event generated at the event source 210, and so on). The event notifications 204, 206, 208 are received at the event reporter 202 on a serial basis, with the "event notification 2" 206 being received after the "event notification 1" 204 and with no intervening event notifications being received between the notifications 204, 206. The notifications 204, 206, 208 are received at the event reporter 202 at a first rate (i.e., a first frequency), and the first rate determines an amount of time between the receipt of each of the notifications 204, 206, 208 at the event reporter 202.

The event reporter 202 receives a plurality of desired sampling rates 212 from the plurality of event consumers 214, 216, 218. The desired sampling rates 212 indicate rates at which the event consumers 214, 216, 218 desire reporting of event notifications from the event reporter 202. The plurality of desired sampling rates 212 includes a number of different sampling rates. For example, each of the event consumers 214, 216, 218 may have a particular desired sampling rate that is specific to that event consumer. The event consumers 214, 216, 218 may correspond to three different clients (e.g., three different applications), and the three different clients may each have a different desired sampling rate (e.g., 20 ms, 5 ms, and 33 ms).

In attempting to best meet the desired sampling rates 212, the event reporter 202 filters the event notifications 204, 206, 208 based on the first rate and the desired sampling rates 212. The filtering selects one or more of the event notifications 204, 206, 208 to be reported to one or more of the event consumers 214, 216, 218, and the event notifications 204, 206, 208 not selected by the filtering are not reported to any of the event consumers 214, 216, 218. The event reporter 202 thus reports the selected one or more of the event notifications 210 based on the first rate and the desired sampling rates 212, as indicated in FIG. 2.

Because the desired sampling rates 212 include the number of different sampling rates, the event reporter 202 is able to provide asynchronous event reporting to the event consumers 214, 216, 218. In an example, the first rate causes an event notification of the event notifications 204, 206, 208 to be received at the event reporter 202 every 10 ms, the first event consumer 214 desires event reporting at a rate of one event notification per 20 ms, the second event consumer 216 desires event reporting at a rate of one event notification per 5 ms, and the Mth event consumer 218 desires event reporting at a rate of one event notification per 33 ms. The event reporter 202 filters the event notifications 204, 206, 208 based on the first rate and the desired sampling rates 212 and provides event notifications i) to the first event consumer 214 at a rate of one event notification per 20 ms, ii) to the second event consumer 216 at a rate of one event notification per 10 ms, and iii) to the Mth event consumer 218 at a rate of one event notification per 30 ms. Such asynchronous event reporting to the event consumers 214, 216, 218 is achieved by filtering the event notifications 204, 206, 208 according to one or more conditions, as described in further detail below.

Conventional event reporting systems lack the ability to provide asynchronous event reporting of the type described above. For example, in a conventional event reporting system, a single event source (e.g., sensor device) is shared among multiple event consumers (e.g., applications or clients), and each of the multiple event consumers requests a different sampling rate. For example, a client A requests a 0 ms delay, a client B requests a 66 ms delay, and a client C requests a 200 ms delay. In the conventional system, the event source is only able to report event notifications at a single sampling rate. For example, the event source in the conventional system supports event reporting at the single sampling rate of 10 ms. Thus, the client A that requested the 0 ms delay receives event notifications from the event source at 10 ms intervals, the client B that requested the 66 ms delay receives event notifications from the event source at 10 ms intervals, and the client C that requested the 200 ms delay receives event notifications from the event source at 10 ms intervals. Such event reporting is synchronous, with all of the clients receiving the event notifications at the same time intervals. The client A gets less data than requested, while the clients B and C receive more data than requested.

By contrast, using the example system 200 of FIG. 2 for event reporting, the client A receives event notifications from the event reporter 202 at 10 ms intervals, the client B receives event notifications from the event reporter 202 at 60 ms intervals, and the client C receives event notifications from the event reporter 202 at 200 ms intervals. Such event reporting is asynchronous and allows the clients to receive the event notifications at varying time intervals, where each of the different time intervals closely approximates the client's desired sampling rate. The example system 200, in comparison to the conventional system, saves system power by reporting event notifications to certain clients less frequently. The example system 200 thus prevents an event consumer from being flooded with unwanted data from an event source.

Figure 3A:
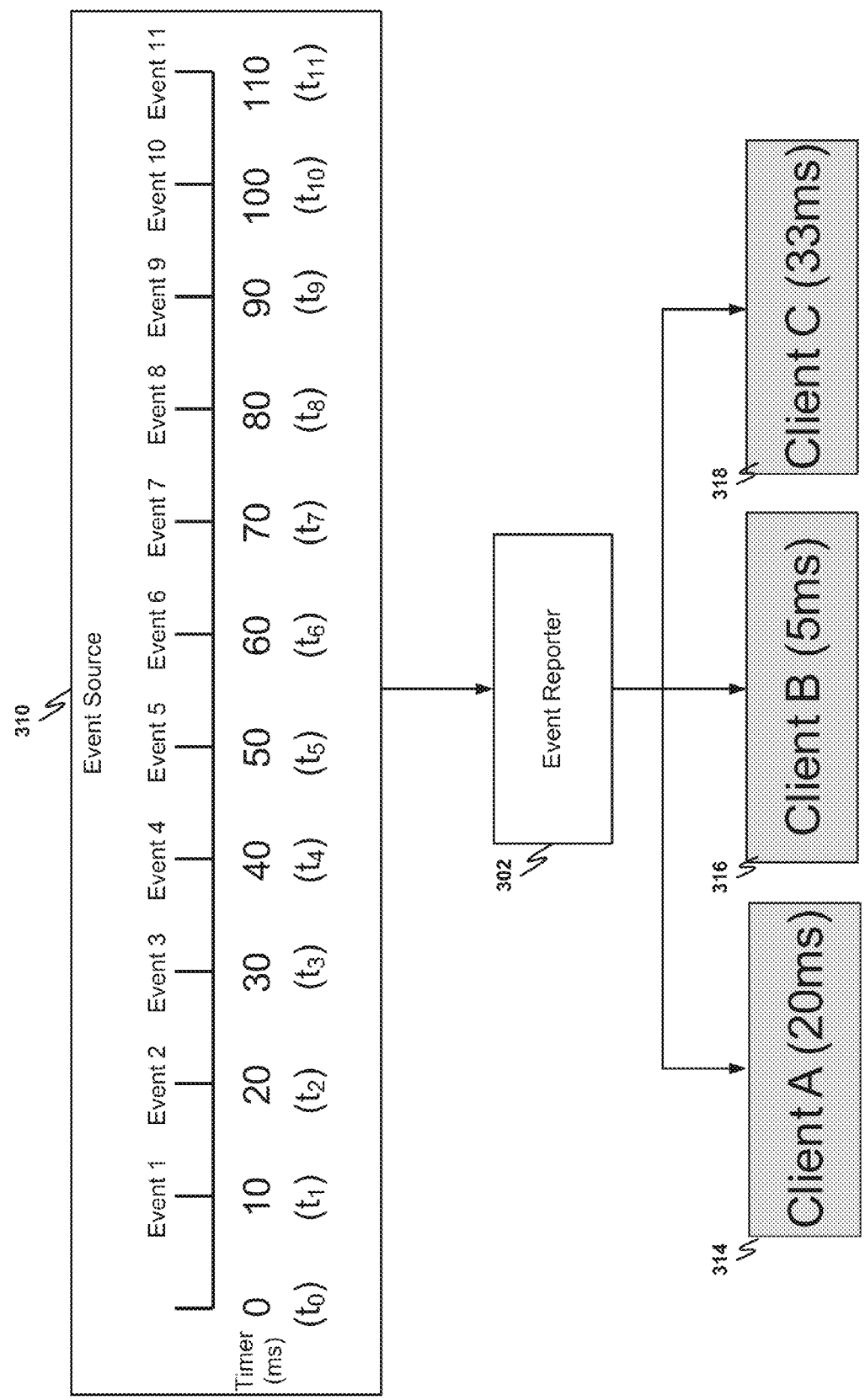
FIG. 3A depicts an event reporter that receives event notifications from an event source and filters the event notifications based on a plurality of conditions.

FIG. 3A depicts an event reporter 302 that receives event notifications from an event source 310 and filters the event notifications based on one or more conditions. In the example of FIG. 3A, the event source 310 includes a coarse-grained timer with events timed at 10 ms intervals. Thus, as illustrated in FIG. 3A, a first event (i.e., "Event 1") occurs at a time $t_1$, where the time $t_1$ is equal to 10 ms. At the time $t_1$, an event notification for the first event is received at the event reporter 302. The second through eleventh events occur at the times $t_2$ through $t_{11}$ (i.e., 20 ms-110 ms), as illustrated in FIG. 3A, with event notifications for these events being delivered to the event reporter 302 as the events occur. The event source 310 is a sensor device that generates data at the 10 ms intervals. For example, the event source 310 may be a temperature sensor that measures an ambient air temperature at 10 ms intervals. The event source 310 transmits event notifications to the event reporter 302 at the 10 ms intervals, where an event notification includes data related to an associated event (e.g., the event notification may include the measured temperature and time associated with the measured temperature in the example of the temperature sensor).

As illustrated in FIG. 3A, three clients 314, 316, 318 (i.e., three event consumers) receive event notifications from the event reporter 302. Each of the three clients 314, 316, 318 is associated with a different desired sampling rate. The client A 314 desires reporting of event notifications at intervals of 20 ms, the client B 316 desires reporting of event notifications at intervals of 5 ms, and the client C 318 desires reporting of event notifications at intervals of 33 ms. The desired sampling rates of the clients 314, 316, 318 are transmitted to the event reporter 302. The event reporter 302 filters the event notifications received from the event source 310 based on the 10 ms sampling rate of the event source 310 and the desired sampling rates of the clients 314, 316, 318. The filtering selects one or more of the event notifications to be reported to the clients 314, 316, 318.

Specifically, the event reporter 302 filters the event notifications based on a plurality of conditions to provide asynchronous event reporting to the clients 314, 316, 318. In one example, the condition is $$\left(\sum_{i>0}^{n}(t_i - t_{i-1}) + \Delta t'\right) > \Delta t_a,$$

where $t_i$ is a time in which a notification for an event i is received at the event reporter 302, and $t_{i-1}$ is a time in which a notification for an event (i−1) is received at the event reporter 302. In the condition, the variable i is greater than 0, and the variable i is less than or equal to the variable n, where i and n are integer numbers. A previous event is reported to one or more of the clients 314, 316, 318 at a time $t_0$, and the variable n represents a number of event notifications that are received at the event reporter 302 after reporting the previous event at the time $t_0$. In the condition, $\Delta t'$ is a period of time, and $\Delta t_a$ is an amount of time corresponding to a desired sampling rate for a client a of the clients 314, 316, 318. Thus, the condition determines if a sum is greater than the amount of time $\Delta t_a$, where the sum is equal to a selected time period ($\Delta t'$) plus an integer multiple of an amount of time between the receipt of notifications for consecutive events at the event reporter 302.

If the condition is true, a notification for an event n is selected to be reported to the client a, where the notification for the event n is received at the event reporter 302 at a time $t_n$. After reporting the event notification for the event n to the client a, the variable i is cleared to a value of "0." If the condition is false, the notification for the event n is not reported to the client a.

The period of time $\Delta t'$ is selected based on a predicted time $t_{n+1}$, where the predicted time $t_{n+1}$ predicts when a notification for a future event (n+1) will be received at the event reporter 302. Thus, in considering whether to report to the client a an event notification for the event n, the times $t_n$, $t_{n-1}, \ldots, t_0$ are known, but the time $t_{n+1}$ for the future event (n+1) is unknown. In choosing the period of time $\Delta t'$ based on the predicted time $t_{n+1}$, a number of different approaches may be used. In one example, the period of time $\Delta t'$ is an average value that depends on a timing of event notifications previously received at the event reporter 302. In an example, the period of time $\Delta t'$ is equal to $$\frac{\sum_{i>0}^{n}(t_i - t_{i-1})}{n}.$$

In another example, the period of time $\Delta t'$ is chosen to be equal to $(t_n - t_{n-1})$ (i.e., the period of time $\Delta t'$ is chosen to be equal to a most recent time interval between receipt of consecutive event notifications at the event reporter 302).

Figure 3B:
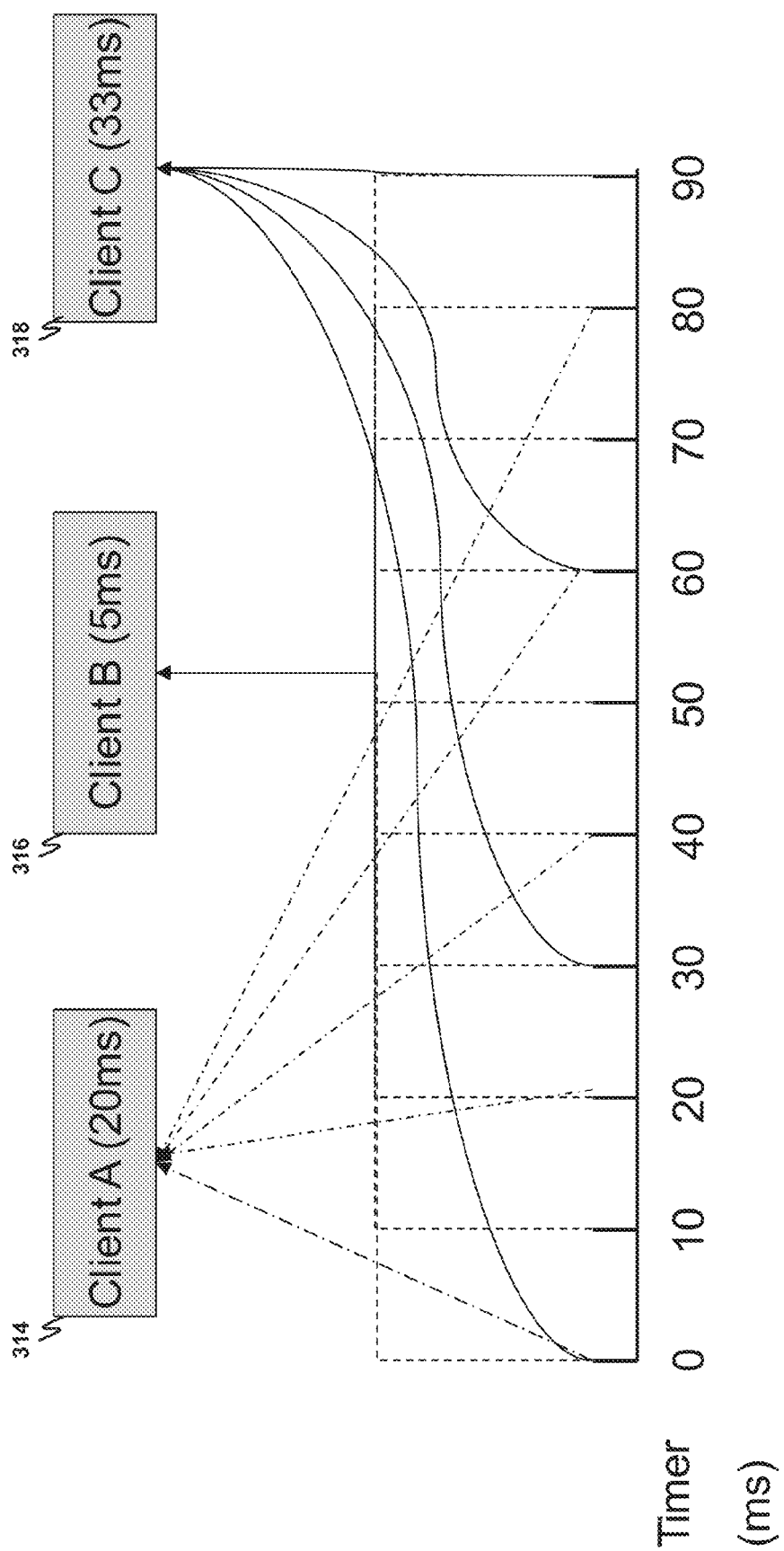
FIG. 3B depicts a reporting of event notifications to a plurality of event consumers, where the reported event notifications have been filtered by an event reporter.

FIG. 3B depicts a reporting of event notifications to the plurality of event consumers 314, 316, 318, where the reported event notifications have been filtered by the event reporter 302. In the example of FIGS. 3A and 3B, the client A 314 desires reporting of event notifications from the event reporter 302 at a rate of one event notification per 20 ms. As illustrated in FIG. 3A, the event reporter 302 receives event notifications from the event source 310 at a rate of one event notification per 10 ms. Thus, if the period of time $\Delta t'$ is chosen to be equal to $(t_n - t_{n-1})$, $\Delta t'$ is set equal to 10 ms. In evaluating whether to report an event notification for a first event (i.e., "Event 1" occurring at the time $t_1$ of 10 ms, as illustrated in FIG. 3A) to the client A 314, the variable n is first set equal to "1," and the condition $(t_1-t_0)+\Delta t'>\Delta t_a$ is evaluated. With $t_1$ equal to 10 ms, $t_0$ equal to 0 ms, $\Delta t'$ equal to 10 ms, and $\Delta t_a$ equal to 20 ms, the condition is false. Thus, an event notification for the first event is not reported to the client A 314.

In next evaluating whether to report an event notification for a second event (i.e., "Event 2" occurring at the time $t_2$ of 20 ms, as illustrated in FIG. 3A) to the client A 314, the variable n is next set equal to "2," and the condition $(t_2-t_1)+(t_1-t_0)+\Delta t'22 \Delta t_a$ is evaluated. With $t_2$ equal to 20 ms, $t_1$ equal to 10 ms, $t_0$ equal to 0 ms, $\Delta t'$ equal to 10 ms, and $\Delta t_a$ equal to 20 ms, the condition is true. Thus, an event notification for the second event is reported to the client A 314. This is illustrated in FIG. 3B, which shows the client A 314 receiving an event notification for the Event 2 at $t_2=20$ ms, but not receiving an event notification for the Event 1 at $t_1=10$ ms. Subsequent Events 3 through 11 are processed in a similar way, such that event notifications are reported to the client A 314 every 20 ms, as illustrated in FIG. 3B. Thus, for the client A 314, the coarse-grained timer of the event source 310 and the event reporter 302 provide event reporting at the desired sampling frequency of one event notification per 20 ms.

The client B 316 desires reporting of event notifications from the event reporter 302 at a rate of one event notification per 5 ms. As described above, if the period of time $\Delta t'$ is chosen to be equal to $(t_n-t_{n-1})$, $\Delta t'$ is set equal to 10 ms (i.e., $\Delta t'$ is equal to the rate at which the event reporter 302 receives event notifications from the event source 310). In evaluating whether to report the event notification for the Event 1 occurring at the time $t_1$ of 10 ms to the client B 316, the variable n is set equal to "1," and the condition $(t_1-t_0)+\Delta t'>\Delta t_a$ is evaluated. With $t_1$ equal to 10 ms, $t_0$ equal to 0 ms, $\Delta t'$ equal to 10 ms, and $\Delta t_a$ equal to 5 ms, the condition is true. Thus, the event notification for the Event 1 is reported to the client B 316. This is illustrated in FIG. 3B, which shows the client B 316 receiving the event notification for the Event 1 at $t_1=10$ ms. Subsequent Events 2 through 11 are processed in a similar way, such that event notifications are reported to the client B 316 every 10 ms, as illustrated in FIG. 3B. Thus, for the client B 316, the coarse-grained timer of the event source 310 cannot provide event reporting at the desired sampling frequency of one event notification per 5 ms, but the reporting at the 10 ms intervals is used to provide reporting at a time interval that best approximates the desired interval.

The client C 318 desires reporting of event notifications from the event reporter 302 at a rate of one event notification per 33 ms. As described above, the period of time $\Delta t'$ is chosen to be equal to 10 ms (e.g., $(t_n-t_{n-1})$). In evaluating whether to report an event notification for the Event 1 to the client C 318, the variable n is first set equal to "1," and the condition $(t_1-t_0)+\Delta t'22 \Delta t_a$ is evaluated. With $t_1$ equal to 10 ms, $t_0$ equal to 0 ms, $\Delta t'$ equal to 10 ms, and $\Delta t_a$ equal to 33 ms, the condition is false. Thus, an event notification for the first event is not reported to the client C 318. Similarly, in evaluating whether to report an event notification for the Event 2 occurring at $t_2=20$ ms to the client C 318, the condition is again false, and the second event is not reported to the client C 318.

In next evaluating whether to report an event notification for the Event 3 occurring at the time $t_3=30$ ms to the client C 318, the variable n is set equal to "3," and the condition $(t_3-t_2)+(t_2-t_1)+(t_1-t_0)+\Delta t'>\Delta t_a$ is evaluated. With $t_3$ equal to 30 ms, $t_2$ equal to 20 ms, $t_1$ equal to 10 ms, $t_0$ equal to 0 ms, $\Delta t'$ equal to 10 ms, and $\Delta t_a$ equal to 33 ms, the condition is true. Thus, an event notification for the third event is reported to the client C 318. This is illustrated in FIG. 3B, which shows the client C 318 receiving an event notification for the Event 3 at $t_3=30$ ms, but not receiving an event notification for Events 1 and 2 at $t_1=10$ ms and $t_2=20$ ms, respectively. Subsequent Events 4 through 11 are processed in a similar way, such that event notifications are reported to the client C 318 every 30 ms, as illustrated in FIG. 3B.

Figure 4:
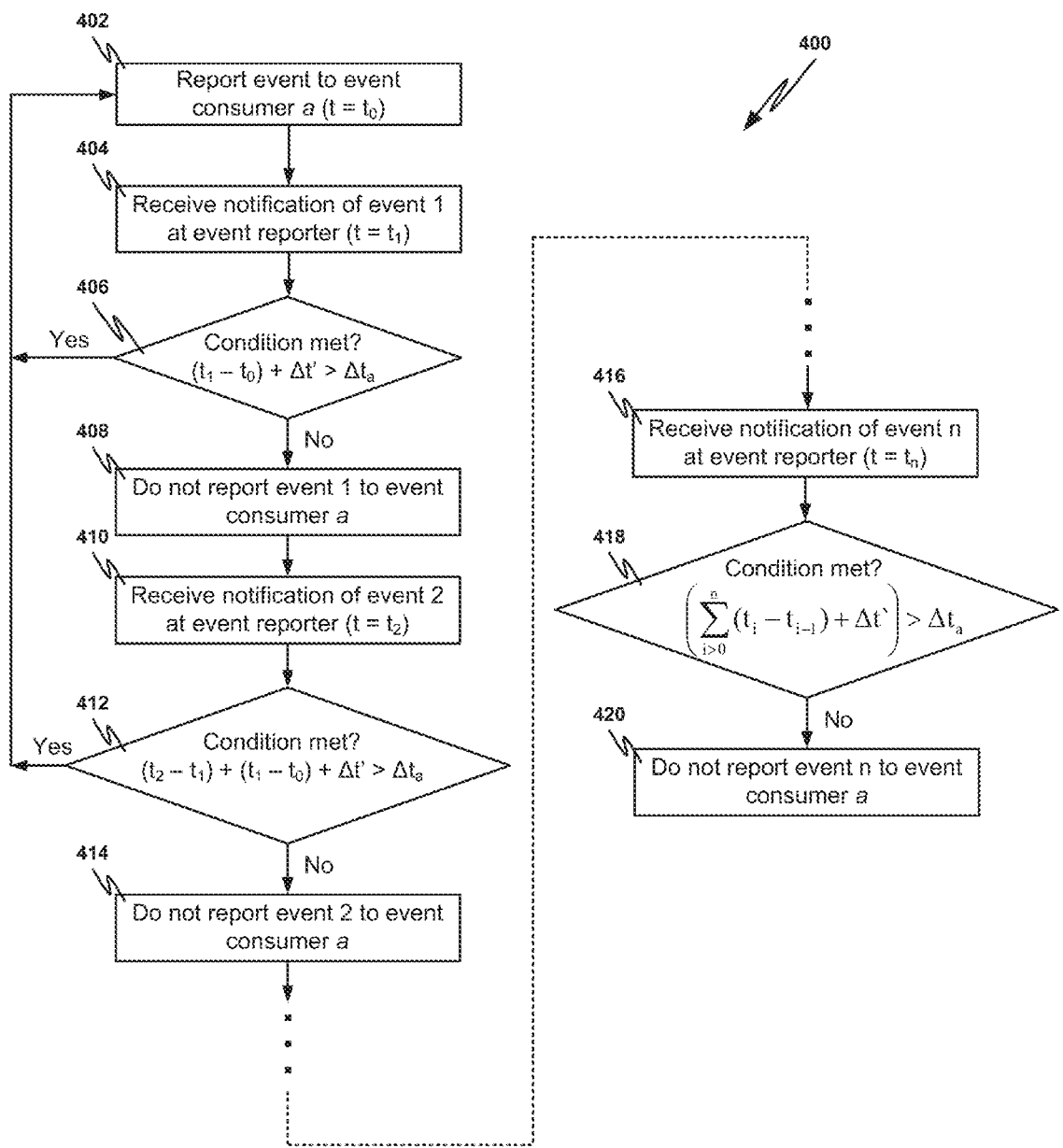
FIG. 4 is a flowchart depicting an example method for event reporting, where the example method filters event notifications based on a condition.

FIG. 4 is a flowchart 400 depicting an example method for event reporting, where the example method filters event notifications based on a condition. At 402, an event is reported to an event consumer a at a time of $t_0=0$, and subsequent steps of the flowchart 400 are directed to determining when another event will be reported to the event consumer a. At 404, a notification for an event 1 is received at an event reporter at a time $t=t_1$. At 406, a condition $(t_1-t_0)+\Delta t'>\Delta t_a$ is evaluated, where $\Delta t'$ is a period of time that attempts to predict a timing of a future event 2 occurring at a time of $t=t_2$, as described above, and $\Delta t_a$ is an amount of time corresponding to a desired sampling rate for the event consumer a. If the condition is met, the flowchart 400 returns to the step 402, where the notification for the event 1 is reported to the event consumer a.

If the condition is not met, the flowchart 400 proceeds to a step 408. At 408, the event notification for the event 1 is not reported to the event consumer a. At 410, a notification for an event 2 is received at the event reporter at a time $t=t_2$. At 412, a second condition $(t_2-t_1)+(t_1-t_0)+\Delta t'>\Delta t_a$ is evaluated. If the second condition is met, the flowchart 400 returns to the step 402, where the notification for the event 2 is reported to the event consumer a. If the second condition is not met, the flowchart 400 proceeds to a step 414. At 414, the event notification for the event 2 is not reported to the event consumer a.

As indicated by ellipses following the step 414, subsequent event notifications are received by the event reporter and processed in a similar manner. At 416, a notification for an event n is received at the event reporter at a time $t=t_n$. At 418, a third condition $$\left(\sum_{i>0}^{n}(t_i-t_{i-1})+\Delta t'\right)>\Delta t_a$$

is evaluated. If the third condition is met, the flowchart 400 returns to the step 402, where the notification for the event n is reported to the event consumer a. If the third condition is not met, the flowchart proceeds to a step 420. At 420, the event notification for the event n is not reported to the event consumer a.

Figure 5:
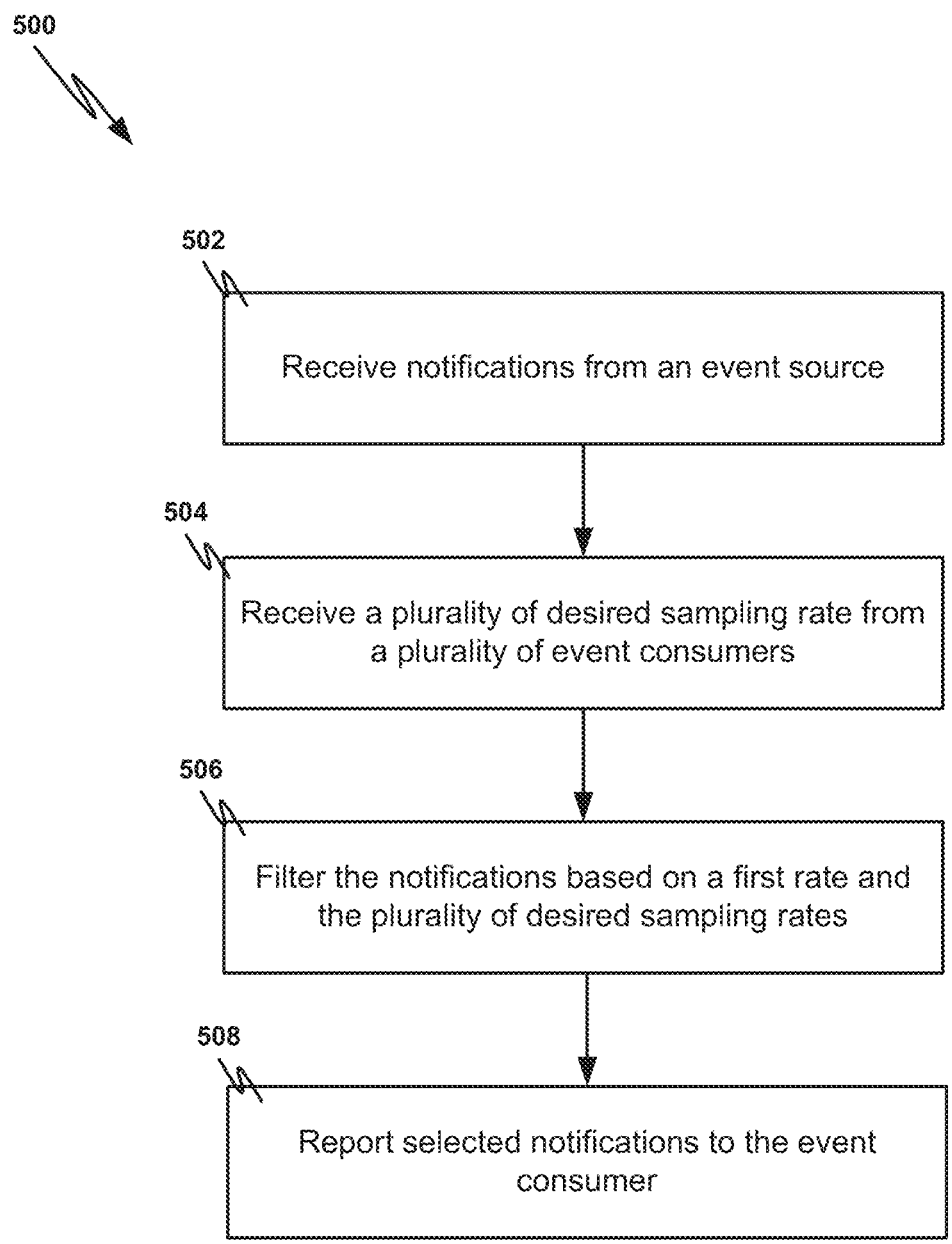
FIG. 5 is a flowchart illustrating an example method for event reporting in a system that includes an event source and a plurality of event consumers.

FIG. 5 is a flowchart 500 illustrating an example method for event reporting in a system that includes an event source and a plurality of event consumers. At 502, notifications from the event source are received at an event reporter. The notifications are received at a first rate. At 504, the event reporter receives a plurality of desired sampling rates from the plurality of event consumers, where each of the desired sampling rates indicates a rate at which an event consumer desires reporting of notifications from the event reporter. At 506, the notifications are filtered based on the first rate and the plurality of desired sampling rates. The filtering selects one or more of the notifications to be reported to one or more event consumers of the plurality of the event consumers. At 508, the selected one or more of the notifications are reported.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method for event reporting in a mobile device that includes a sensor and event consumer applications, the method comprising:

receiving, by an event reporter of the mobile device, notifications from the sensor of the mobile device, wherein the notifications are received at a first rate, wherein the first rate determines a first amount of time between the receipt of each of the notifications at the event reporter;

receiving, by the event reporter, a desired sampling rates from the event consumer applications of the mobile device, wherein each of the desired sampling rates indicates a rate at which the respective event consumer application desires reporting of notifications from the event reporter and corresponds to a desired amount of time between reporting of notifications to the respective application;

filtering the notifications based on the first rate and the desired sampling rates, wherein the filtering selects one or more of the notifications to be reported to one or more event consumer applications of the event consumer applications, wherein the filtering is based on a condition, wherein the condition determines if a sum is greater than the desired amount of time, and wherein the sum is equal to a selected time period plus an integer multiple of the first amount of time; and reporting the selected one or more of the notifications.

2. The method of claim 1, wherein the desired sampling rates include a number of different sampling rates, and wherein the event reporter provides asynchronous event reporting to the event consumer applications based on the number of different sampling rates.

3. The method of claim 1, wherein the sensor comprises at least one of an accelerometer sensor, a temperature sensor, a gravity sensor, a gyroscope sensor, a light sensor, a magnetic field sensor and a pressure sensor.

4. The method of claim 1, wherein the receiving of notifications, the receiving of the desired sampling rates, the filtering and the reporting are performed by software stored in the mobile device.

5. The method of claim 1, wherein the receiving of notifications, the receiving of the desired sampling rates, the filtering and the reporting are performed by a hardware module of the mobile device.

6. A method for event reporting in a mobile device that includes a sensor and event consumer applications, the method comprising:

receiving, by an event reporter of the mobile device, notifications from the sensor, wherein the notifications are received at a first rate;

receiving, by the event reporter, desired sampling rates from the event consumer applications of the mobile device, wherein each of the desired sampling rates indicates a rate at which the respective event consumer application desires reporting of notifications from the event reporter;

filtering the notifications based on the first rate and the desired sampling rates, wherein the filtering selects one or more of the notifications to be reported to one or more event consumer applications of the event consumer applications; and reporting the selected one or more of the notifications, wherein the filtering of the notifications is based on a condition $$\left(\sum_{i>0}^{n}(t_i - t_{i-1}) + \Delta t'\right) > \Delta t_a,$$

where $t_i$ is a time in which a notification for an event i is received at the event reporter, $t_{i-1}$ is a time in which a notification for an event (i−1) is received at the event reporter, $\Delta t'$ is a period of time, and $\Delta t_a$ is an amount of time corresponding to a desired sampling rate for an event consumer application a of the event consumer applications, wherein the time $t_i$ occurs after the time $t_{i-1}$, and wherein a notification for an event n is selected to be reported to the event consumer application a if the condition is true, the notification for the event n being received at the event reporter at a time $t_n$.

7. The method of claim 6, wherein the first rate determines a first amount of time between the receipt of each of the notifications at the event reporter, wherein $(t_i 1 - t_{i-1})$ is equal to the first amount of time and $\Delta t'$ is equal to the first amount of time.

8. The method of claim 6, further comprising:
selecting the period of time $\Delta t'$ based on a predicted time $t_{n+1}$, wherein the predicted time $t_{n+1}$ predicts when a notification for a future event (n+1) will be received at the event reporter, the time $t_{n+1}$ occurring after the time $t_n$.

9. The method of claim 6, wherein the notifications for the events (i−1) and i are received consecutively at the event reporter, with no intervening notifications being received from the sensor between the times $t_{i-1}$ and $t_i$.

10. The method of claim 6, further comprising:
reporting the notification for the event n to the event consumer application α at the time $t_n$ if the condition is true, wherein the notification for the event n is an nth notification that is received at the event reporter from the sensor following a reporting of a previous notification to the event consumer application a.

11. The method of claim 6, further comprising:
selecting the period of time $\Delta t'$ to be equal to a difference between the time $t_n$ and a time $t_{n-1}$, wherein the time $t_{n-1}$ is a time in which a notification for an event (n−1) is received at the event reporter, and wherein the time $t_n$ occurs after the time $t_{n-1}$.

12. The method of claim 6, wherein the first rate determines a first amount of time between the receipt of each of the notifications at the event reporter, the method further comprising:
selecting the period of time $\Delta t'$ to be equal to the first amount of time.

13. The method of claim 6, further comprising:
selecting the period of time $\Delta t'$ to be equal to $$\frac{\sum_{i>0}^{n}(t_i - t_{i-1})}{n}.$$

14. The method of claim 6, further comprising:
reporting all of the received notifications to the event consumer application a if the desired sampling rate for the event consumer application α is less than the first rate.

15. A mobile device comprising:
a sensor configured to generate notifications;
event consumer applications; and
an event reporter configured to
receive notifications from the sensor at a first rate that determines a first amount of time between the receipt of each of the notifications at the event reporter,
receive desired sampling rates from the event consumer applications, wherein each of the desired sampling rates indicates a rate at which the respective event consumer application desires reporting of notifications from the event reporter and corresponds to a desired amount of time between reporting of notifications to the respective application,
filter the notifications based on the first rate and the desired sampling rates, wherein the filtering selects one or more of the notifications to be reported to one or more event consumer applications of the event consumer applications based on a condition, wherein the condition determines if a sum is greater than the desired amount of time, and wherein the sum is equal to a selected time period plus an integer multiple of the first amount of time, and
report the selected one or more of the notifications.

16. The mobile device of claim 15, wherein the desired sampling rates include a number of different sampling rates, and wherein the event reporter provides asynchronous event reporting to the event consumers based on the number of different sampling rates.

17. The mobile device of claim 15, wherein the sensor comprises at least one of an accelerometer sensor, a temperature sensor, a gravity sensor, a gyroscope sensor, a light sensor, a magnetic field sensor and a pressure sensor.

18. The mobile device of claim 15, wherein the event reporter is a software module of the mobile device.

19. The mobile device of claim 15, wherein the event reporter is a hardware module of the mobile device.

20. A mobile device comprising:
a sensor configured to generate notifications;
event consumer applications; and
an event reporter configured to
receive notifications from the sensor at a first rate,
receive desired sampling rates from the event consumer applications, wherein each of the desired sampling rates indicates a rate at which the respective event consumer application desires reporting of notifications from the event reporter,
filter the notifications based on the first rate and the desired sampling rates, wherein the filtering selects one or more of the notifications to be reported to one or more event consumer applications of the event consumer applications;
wherein the event is configured to reporter filter the notifications based on a condition $$\left(\sum_{i>0}^{n}(t_i - t_{i-1}) + \Delta t'\right) > \Delta t_a,$$

where $t_i$ is a time in which a notification for an event i is received at the event reporter, $t_{i-1}$ is a time in which a notification for an event (i-1) is received at the event reporter, $\Delta t'$ is a period of time, and $\Delta t_a$ is an amount of time corresponding to a desired sampling rate for an event consumer application a of the event consumer applications, wherein the time $t_i$ occurs after the time $t_{i-1}$, and
wherein a notification for an event n is selected to be reported to the event consumer application a if the condition is true, the notification for the event n being received at the event reporter at a time $t_n$.

* * * * *